United States Patent [19]
King et al.

[11] Patent Number: 5,848,276
[45] Date of Patent: Dec. 8, 1998

[54] HIGH SPEED, DIRECT REGISTER ACCESS OPERATION FOR PARALLEL PROCESSING UNITS

[75] Inventors: Edward C. King, Pleasanton; Alan G. Smith, Dublin, both of Calif.; Scott Smith, Colorado Springs, Colo.

[73] Assignee: CPU Technology, Inc., Pleasanton, Calif.

[21] Appl. No.: 554,671

[22] Filed: Nov. 8, 1995

Related U.S. Application Data

[63] Continuation of Ser. No. 163,413, Dec. 6, 1993, abandoned.

[51] Int. Cl.$^6$ ........................................................ G06F 9/30
[52] U.S. Cl. ...................... 355/726; 395/677; 395/800.18; 395/377
[58] Field of Search ................................. 395/650, 800, 395/375, 726, 677, 800.18, 377

[56] References Cited

U.S. PATENT DOCUMENTS

| | | | |
|---|---|---|---|
| 3,678,467 | 7/1972 | Nussbaum et al. | 340/172.5 |
| 4,414,624 | 11/1983 | Summer, Jr. et al. | 395/650 |
| 4,594,657 | 6/1986 | Byrns | 395/725 |
| 4,636,942 | 1/1987 | Chen et al | 395/725 |
| 4,803,620 | 2/1989 | Inagami et al. | 395/375 |
| 4,901,230 | 2/1990 | Chen et al. | 395/325 |
| 4,922,418 | 5/1990 | Dolecek | 395/575 |
| 5,142,676 | 8/1992 | Fried et al. | 395/425 |
| 5,161,122 | 11/1992 | Robertson | 365/195 |
| 5,170,484 | 12/1992 | Grondalski | 395/800 |
| 5,187,799 | 2/1993 | McAuley et al. | 395/800 |
| 5,193,204 | 3/1993 | Qureshi et al. | 395/800 |
| 5,197,137 | 3/1993 | Kumar et al. | 395/375 |
| 5,255,370 | 10/1993 | Sako et al. | 395/250 |
| 5,276,828 | 1/1994 | Dion | 395/425 |
| 5,276,886 | 1/1994 | Dror | 395/725 |
| 5,347,639 | 9/1994 | Rechtschaffen et al. | 395/375 |
| 5,367,690 | 11/1994 | Schiffleger | 395/725 |
| 5,371,896 | 12/1994 | Gove et al. | 395/800 |
| 5,375,215 | 12/1994 | Hanawa et al. | 395/425 |
| 5,404,489 | 4/1995 | Woops et al | 395/425 |
| 5,414,856 | 5/1995 | Yokota | 395/728 |
| 5,524,212 | 6/1996 | Somani et al. | 395/200.08 |
| 5,524,260 | 6/1996 | Matsuda | 395/800 |
| 5,579,505 | 11/1996 | Ohkami | 395/482 |
| 5,598,568 | 1/1997 | Frisch | 395/200.09 |

OTHER PUBLICATIONS

"Computer Architecture A Quantitative Approach" 1990 Inside Cover + pp. 213,214,224,225,264.

*Primary Examiner*—Ayaz R. Sheikh
*Assistant Examiner*—Paul R. Myers
*Attorney, Agent, or Firm*—Townsend and Townsend and Crew LLP

[57] ABSTRACT

The present invention provides for a computer system having a plurality of parallel processor units with each processor unit associated with at least one register for receiving data for the processor unit. The computer system has a bus unit, coupled to the output of each processor unit and the associated register of each processor unit, to transfer the output data of a first processor unit into an associated register of a second processor unit in a single computer operation. The second processor unit is prevented from reading the associated register until the bus unit transfers the output data from the first processor unit to the second processor unit.

5 Claims, 5 Drawing Sheets

OPCODE DEFINITION:

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|----|----|
| ✕  | ✕  | ✕  | ✕  | ✕  | ✕  | ✕ | ✕ | ✕ | ✕ | ✕ | ✕ | ✕ |   | Rs |    |

INSTRUCTION DEFINITION:
MARK REGISTER Rs AS BUSY. IF PROCESSOR UNIT SUBSEQUENTLY USES THE REGISTER IT WILL STALL UNTIL ANOTHER PROCESSOR UNIT EXECUTES A DERAW TO UPDATE THE REGISTER.

FIG. 2A.

OPCODE DEFINITION:

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|----|----|
| ✕  | ✕  | ✕  | ✕  | ✕  | ✕  | ✕ |   | Rs |   |   | Rp |   |   | Rd |    |

INSTRUCTION DEFINITION:
MODIFY THE CONTENTS OF A REGISTER IN AN EXTERNAL PROCESSOR. Rp CONTAINS THE PROCESSOR ID. Rs CONTAINS THE DATA IN THE LOCAL PROCESSOR TO BE WRITTEN TO THE TARGET PROCESSOR. Rd IS THE REGISTER NUMBER OF THE TARGET REGISTER TO BE MODIFIED.

FIG. 2B.

PROCESSOR 1          PROCESSOR 2          PROCESSOR 3
  A * B                A + B                A - B
SEND TO 2 ⟶ (A * B)*(A + B) ⟶ X ⟶ (A * B)*(A - B) ⟶ Y
SEND TO 3 ⟶                    X + Y ⟵ SEND TO 2
  C * D                         X - Y
C * D * (X + Y) ⟵ SEND TO 3           F * G
                                ⟶ (F * G)*(X - Y)

FIG. 3A.

```
PROCESSOR 1:
        MOVL    R0,A
        LDD     R6, [R0]
        MOVL    R0,B
        LDD     R7, [R0]
        MUL     R6,R7
        MOVO    R1,2        ; TARGET PROC ID
        DERAW   R5,R1,R6    ; SEND A * B TO PROC 2
        MOVO    R1,3
        DERAW   R5,R1,R6    ; SEND A * B TO PROC 3
        DERAR   R4          ; PREPARE TO RECEIVE (X + Y)
        MOVL    R0,C
        LDD     R6, [R0]
        MOVL    R0,D
        LDD     R7, [R0]
        MUL     R6,R7
        MUL     R6,R4       ; WILL WAIT UNTIL DATA ARRIVES

PROCESSOR 2:
        DERAR   R5          ; PREPARE TO RECEIVE (A * B)
        DERAR   R4          ; PREPARE TO RECEIVE Y
        MOVL    R0,A
        LDD     R6, [R0]
        MOVL    R0,B
        LDD     R7, [R0]
        ADD     R6,R7
        MUL     R6,R5       ; (A * B) * (A + B)
        MOVL    R0,X
        STD     [R0],R6     ; STORES X
        ADD     R7,R6,R4    ; X + Y
        MOVO    R1,1
        DERAW   R4,R1,R7    ; SEND (X + Y) TO PROC 1
        SUB     R7,R6,R4    ; X - Y
        MOVO    R1,3
        DERAW   R4,R1,R7    ; SEND (X - Y) TO PROC 3
```

FIG. 3B.

```
PROCESSOR 3:
        DERAR    R5            ; PREPARE TO RECEIVE (A * B)
        DERAR    R4            ; PREPARE TO RECEIVE (X - Y)
        MOVL     R0,A
        LDD      R6,[R0]
        MOVL     R0,B
        LDD      R7,[R0]
        SUB      R6,R7
        MUL      R6,R5         ; (A * B) * (A - B)
        MOVL     R0,Y
        STD      [R0],R6       ; STORE  Y
        MOVO     R1,2
        DERAW    R4,R1,R6      ; SEND Y TO PROC 2
        MOVL     R0,F
        LDD      R6,[R0]
        MOVL     R0,G
        LDD      R7,[R0]
        MUL      R6,R7         ; F * G
        MUL      R6,R4         ; (F * G) * (X - Y)
```

*FIG. 3C.*

```
INIT:     MOVL   R0,BUFFER_BASE_ADDR
          MOV    R1,R0                  ;SET UP BUFFER POINTER
PROCESS:  DERAR  R2                     ;SET DERA BUSY FLAG ON
                                         R2
          CMP    R2,ESCAPE              ;ON NEW DATA, CHECK IF
                                         ESCAPE CODE
          JEQ    EXIT
          STB    [R1],R2                ;PUT DATA_IN INTO BUFFER
          ADD    R1,1                   ;INCREMENT
                                         BUFFER_POINTER
          JMP    PROCESS
EXIT:     MOVL   R3,FINAL_COUNT_ADDR
          SUB    R1,R1,R0               ;TOTAL COUNT TO R1
          STD    [R3],R1                ;STORE DATA_COUNT TO
                                         FINAL_COUNT
          RET
```

*FIG. 5B.*

HIGH SPEED, DIRECT REGISTER ACCESS OPERATION FOR PARALLEL PROCESSING UNITS

This is a Continuation of application Ser. No. 08/163,413, filed Dec. 6, 1993, now abandoned.

BACKGROUND OF THE INVENTION

The present invention is related to the field of computer architecture and organization and, more particularly, to the high speed operation and synchronization of computer processor units operating in parallel.

A general goal for computers is faster operation. One solution has been to develop individual processor units with higher operating speeds. Other solutions have been to develop computers with multiple processor units operating in parallel. Compared to a computer with a single processor, computers have not had the desired increase in operating speeds as might be expected. As the number of parallel processor units has increased, the complexity of the parallel processing increased even more and the marginal increase in operating speeds have fallen.

An impediment to high speed parallel processing has been an instruction to one processor unit requiring data from another processor unit. The first processor unit cannot proceed until the data arrives. For high speed operation, each processor unit typically has a set of high speed registers associated with the processor unit. The described situation requires that the data calculated by a second processor unit be written from the second processor unit to a register associated with the first processor unit.

This transfer of data from the second processor unit to the first processor unit in parallel processing systems heretofore has taken time, at least a few computer operations occupying a number of clock cycles in optimized parallel processor systems. Furthermore, measures must be taken to ensure that the operations of the two processor units are synchronized so that the first processor unit does not proceed until the required data from the second processor unit is received. Thus this common operation creates some of the complexity of parallel processing.

The present invention offers an operation by which the output data of a second processor unit is written to a register associated with a first processor unit in a single computer operation, which occurs in one clock cycle. Furthermore, the operations of the two processor units are synchronized by a special instruction to the second processor unit which prevents the first processor from reading any data from its associated register until the second processor has written to that register. Thus the present invention offers high speed and a reduction in complexity in parallel processing.

SUMMARY OF THE INVENTION

The present invention provides for a computer system having a plurality of parallel processor units with each processor unit associated with at least one register for receiving data for the processor unit. The computer system has a bus unit, coupled to the output of each processor unit and the associated register of each processor unit, to transfer the output data of a first processor unit into an associated register of a second processor unit in a single computer operation. The second processor unit is prevented from reading the associated register until the bus unit transfers the output data from the first processor unit to the second processor unit.

BRIEF DESCRIPTION OF THE DRAWINGS

A clearer understanding of the present invention may be achieved by a perusal of the following description of specific embodiments with reference to the following drawings:

FIGS. 2A and 2B list direct external register access instructions which direct the operation of computer system of FIG. 1;

FIG. 3A illustrates processor unit operation and data movement when executing direct external register access instructions according to the present invention;

FIGS. 3B and 3C are an exemplary program which illustrates the direct external register access instructions according to the present invention;

FIG. 5B is an exemplary program which illustrates how a DERAW is issued to one of the processor units in FIG. 1 from a non-processor unit in accordance to the present invention.

DESCRIPTION OF PREFERRED EMBODIMENT(S)

Figure 1:
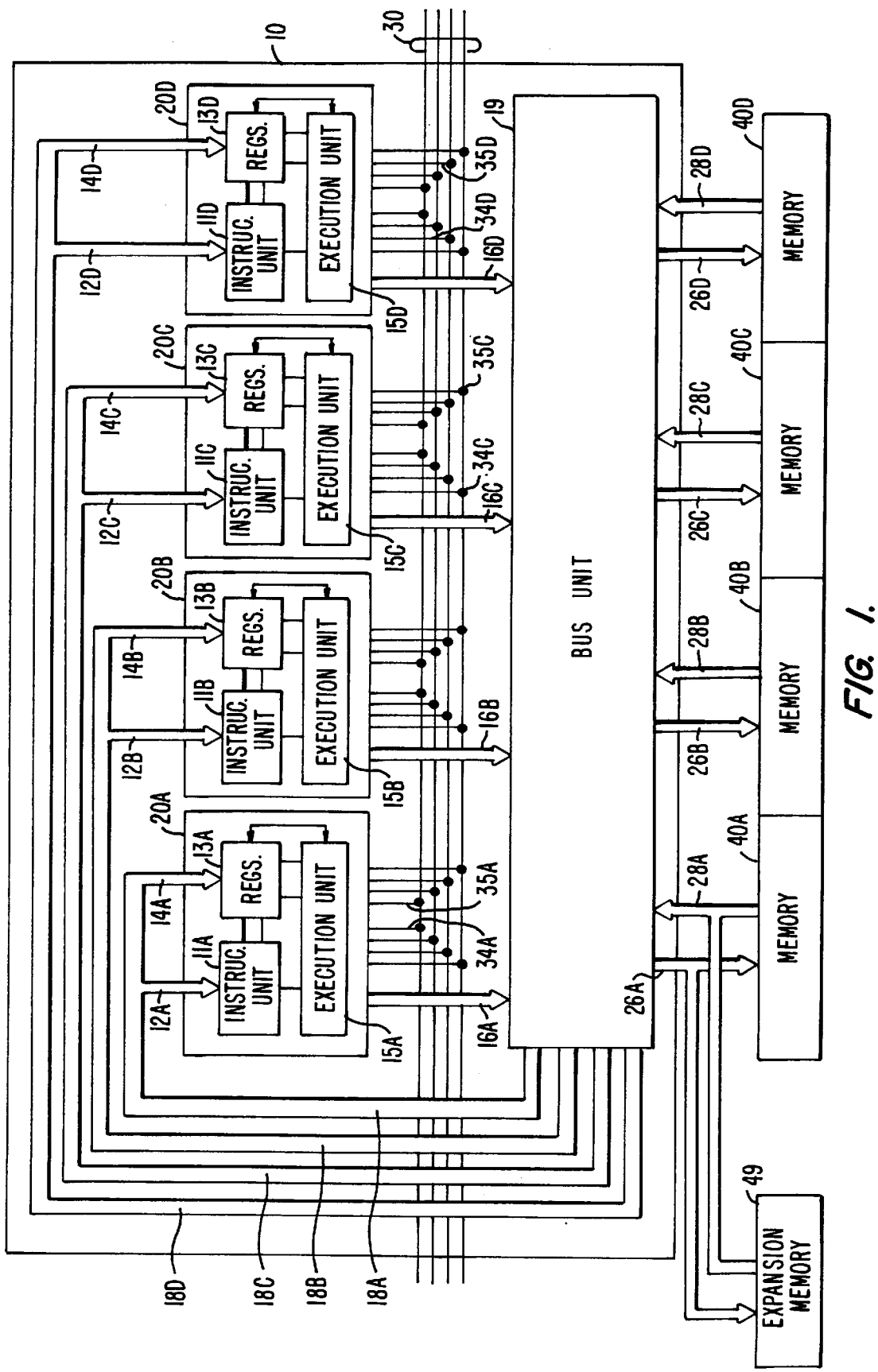
FIG. 1 is a block diagram of an integrated circuit having multiple processor units implementing the present invention.

FIG. 1 is a block diagram of four processor units 20A–20D which are connected in parallel on an integrated circuit 10. Many similar elements are associated with each of the parallel processor units 20A–20D and the association to a particular processor unit is indicated by a letter suffix, A–D, to a reference numeral. In the following description where a particular element is referenced, the reference numeral including the letter suffix is used. Where an element is being generally described, a reference numeral with no letter suffix is used and it should be understood that the description refers to the subject element in the context of its associated processor unit. Of course, where an element has no letter suffix, only a reference numeral is used.

Each processor unit 20 has an instruction unit 11 which receives instructions on a instruction path 12, a set of eight 32-bit registers 13 which receives data from a data path 14, and an execution unit 15 which executes the instruction in accordance with the control signals from the instruction unit 11.

Each of the processor units 20 is connected to a bus unit 19 by 32-bit wide paths 16 and 18. Data moves from the processor unit 20 to the bus unit 19 along the data path 16; data, including instructions, returns from the bus unit 19 to each processor unit 20 along the data path 18. In FIG. 1, the return path 18 is illustrated as being split into the instruction path 12 and the data path 14. In fact, the return path 18 is connected to a multiplexer (not shown) in each of the processor units 20. The multiplexer, in response to control signals, selects the instruction unit 11 or the register set 13 as the destination of the data on the return path 18.

The bus unit 19 is connected by 32-bit wide data paths 26 and 28 for each of the processor units 20 to a memory 40. As shown, the bus unit 19 is part of the integrated circuit and the memory 40 is not. Additional or expansion memory 49 is available through a port connected to one of the processor units 20. In FIG. 1, the expansion memory is connected through the data paths 26A and 28A. The expansion memory 49 may be in the form of semiconductor memory, disk memory, and the like.

The processor units 20 are each connected to a set of four signal lines 30 as shown in FIG. 1. Each processor unit 20 is connected to each signal line 30 by a line 34 which can set the signal level of the signal line and a second line 35 which can monitor the signal level of the signal line. These signal lines operate in synchronization operations, which are different from the bitmerge operation synchronization described below, and are detailed in U.S. Ser. No. 08/163,442, filed of even date and assigned to the present assignee.

Each of the signal lines 30 is also connected to input/output pins (not shown) of the integrated circuit 10. Thus several of the integrated circuits 10 may be coupled in parallel so that the processors 20 in each integrated circuit 10 are connected in parallel and that each processing unit 20 in each integrated circuit 10 is connected in common to each of the signal lines 30. The integrated circuits 10 may be connected together to create a computer having 4 by N processor units, where N is the number of integrated circuits.

In a direct external register access (DERA) operation, a first processor unit can be prevented from reading one or more of its own registers 13 until a source external to the processor unit performs a special write operation into the indicated register 13. This write operation unlocks the register 13 and the processor unit 13 can then proceed in executing its subsequent instructions. Thus, in accordance with the present invention, external events may participate in internal register interlocks to eliminate the need of predictive synchronization between two coupled activities. Synchronization can occur in one computer operation, which is performed by the described embodiment of the present invention in one clock cycle. Furthermore, during this synchronization, data can be transferred not only between processor units, but also between an external device and a processor unit.

FIGS. 2A and 2B list two DERA instructions and their opcode fields. A processor unit executing a DERAR (Direct External Register Access Read) instruction, listed in FIG. 2A, locks the register 13 designated by a 3-bit Rs field in the instruction. A subsequent instruction which attempts to use the designated register 13 will not be effective and the processor unit stalls.

A DERAW (Direct External Register Access Write) instruction, listed in FIG. 2B, executed by another processor unit can unlock the register 13 indicated by the Rs field in the DERAR instruction. The DERAW instruction has three 3-bit register address fields, Rs, Rp, and Rd. The Rs field of the DERAW instruction indicates the register 13 of the DERAW-executing processor unit from which data is to be copied. The Rp field indicates a register containing the number of the processor unit 20, and the Rd field the particular register 13 of the processor unit 20, to which the data is to be copied.

FIGS. 3A, 3B and 3C illustrates the operation of a simple program with three processor units, labelled 1, 2 and 3, performing DERA instructions according to the present invention. The program solves the following equations:

$$X=(A * B)+(A+B)$$

$$Y=(A * B)+(A-B)$$

$$Z=(C * D) * (X+Y)$$

$$W=(F * G) * (X-Y)$$

FIG. 3A illustrates the operations in each processor unit and the movement of data between the parallel processor units; FIGS. 3B and 3C list the program instructions executed by each processor unit.

The processor unit 1 first calculates the value of (A * B), sends the result to the processor unit 2 and then to the processor unit 3, calculates the value of (C * D), and finally calculates (C * D) * (X+Y) after receiving the value of (X+Y) from the processor unit 2. Note that two DERAW instructions are used to unlock the R5 register in the processor units 2 and 3 respectively. A following DERAR instruction locks the R4 register in the processor unit 1 until the value of (X+Y) is written into the register by an unlocking DERAW instruction executed at the processor unit 2.

At the same time, the processor unit 2 first locks its R5 and R4 registers in anticipation of the (A * B) value from the processor unit 1 and the value of Y from the processor unit 3. The processor unit 2 then calculates (A+B) and followed by the product (A * B) * (A+B). Note the last operation cannot be performed until the value (A * B) is placed into the register R5 by the DERAW instruction at the processor unit 1. The processor unit 2 subsequently calculates the values of (X+Y) and (X-Y) respectively, and sends the values to the processor units 1 and 3 with unlocking DERAW instructions.

The processor unit 3 executes a similar set of instructions as processor unit 2 to calculate the value of (A-B). Then after a DERAW instruction at the processor unit 1 places (A * B) in the previously locked R5 register, the processor unit 3 calculates (A * B) * (A-B). The value of Y is then loaded and the processor unit 3 writes Y by a DERAW instruction in the previously locked R4 register of the processor unit 2. Then the processor unit determines (F * G) and calculates the value of (F * G) * (X-Y) after the processor unit 2 has written (X-Y) into the previously locked R4 register by a DERAW instruction.

Thus, with the ease of the automatic locking and unlocking of the DERAR and DERAW instructions, the processor unit 2 calculates the value of X, the processor unit 3 calculates the value of Y, the processor unit 1 the value of Z, and the processor unit 3 the value of W.

Figure 4:
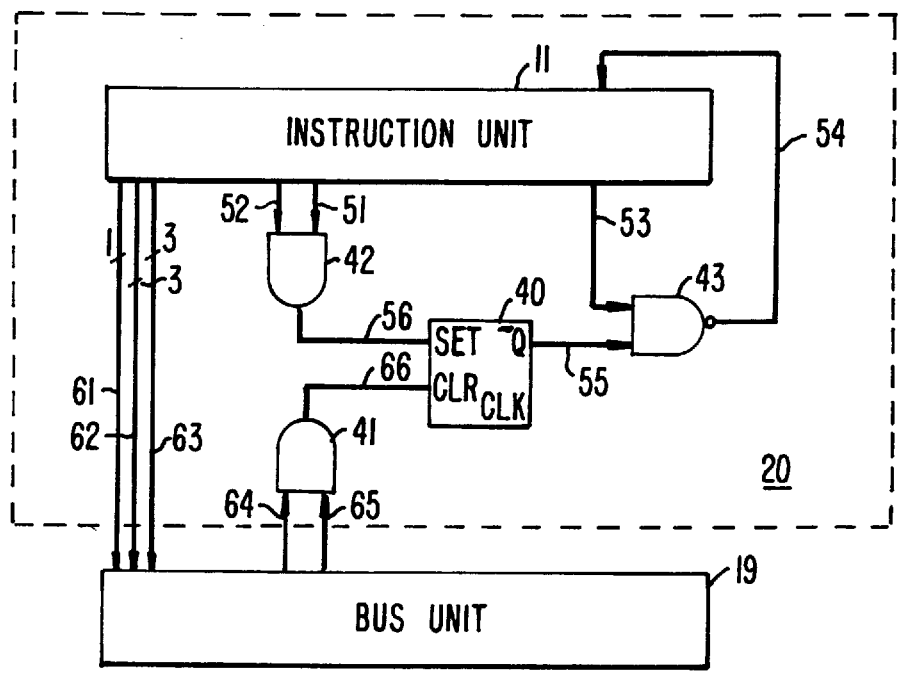
FIG. 4 is a logic diagram of the circuit elements in each processor unit of FIG. 1 to effect the direct external register access operation according to the present invention.

FIG. 4 is an illustration showing the circuit logic in each processor unit 20 and its connection to the bus unit 19 to implement the DERAR and DERAW instructions. A dotted line is used to enclose the processor unit 20 with a wavy dotted line to indicate that only a part of the unit 20 is drawn.

Each register 13 in a processor unit 20 has an associated flip-flop 40 which has a Set input terminal connected to a AND logical gate 42. The gate 42 has one input terminal connected to a DERAR control line 51, which is set when a DERAR instruction is to be executed, from an instruction decoder (not shown) of the instruction unit 11. The gate 42 has another input terminal connected to an address decoder (not shown) which decodes the three-bit Rs field in a DERAR instruction.

The output terminal of the flip-flop 40 is connected to an input terminal of a NAND gate 43, which has a second input terminal connected to the instruction unit 11 by a Read Register control line 53. The Read Register control line 53 is set to a logic 1 when an instruction which requires that particular register 13 is to be executed. The output terminal of the NAND logic gate 43 is connected back into the instruction unit 11 by a Read Register OK control line 54. A logic 1 signal on the control line 54 permits the instruction to be executed; otherwise, the instruction is blocked and the processor unit 20 stalls.

Thus a DERAR instruction sets the flip-flop 40 associated with the register 13 designated by the Rs field in the instruction. The flip-flop 40 has its output set and any subsequent instruction which attempts to use that register 13 is stalled. The processor unit 20 is denied access to the designated register 13.

To implement a DERAW instruction, the instruction unit 11 of each processor unit 20 is connected to the bus unit 19 by a DERAW Request control line 61, three Processor Unit ID control lines 62, and three Register ID control lines 63. The bus unit 19 is also connected to two input terminals of a AND logic gate 41 for each register 13 in each processor unit 20 by a Write Register control line 64 and a DERAW Cycle control line 65 respectively. A signal on the Write Register control line 64 is the result of the decoding of signals on the Processor ID and Register ID control lines 62 and 63 from processor unit 20 to select that particular register. A signal on the DERAW Cycle control line 65 is the result of instruction decoding that a DERA write operation is to be performed. The output terminal of the AND logical gate 40 is connected to a second input terminal of the AND logical gate 43 of its associated register 13.

To execute a DERAW instruction, the source processor unit 20 sets the DERAW Request control line 61 with target processor unit identification, a set bit in the three lowest order bits in the register 13 pointed to by the 3-bit Rp field in the DERAW instruction, on the control lines 62 and the particular register in the target processor unit, identified by the 3-bit Rd field in the DERAW instruction, on the control lines 63. In other words, the control lines 62 and 63 respectively carry addresses of the processor unit and the particular register 13 to which data is to be written under the DERAW instruction in the source processor unit 20. At the same time, the execution of the DERAW instruction by the source processor unit 20 places the data bits from the register 13 in the source processor unit 20 and designated by the Rs field onto the data bus 16.

The bus unit 19 decodes the signals on the control lines 62 and 63 and sends a "logic 1" signal on the Write Register control line 64 of the appropriate register 13 of the targeted processor unit 20. In combination with the DERAW request signal from the source processor unit 20, the bus unit 19 also issues a DERAW Cycle signal on the line 65. This clears the flip-flop 40 of the appropriate register 13 of the targeted processor unit 20 and the data from the source processor unit 20 is written into the appropriate register 13. The flip-flop 40 remains cleared until a DERAR instruction in the targeted processor unit 20 writes to that register 13.

In accordance with the present invention, a DERAW instruction need not be limited to an instruction executed by one of the parallel processor units 20. The DERAW instruction can be passed along the memory bus 17 to the bus unit 19. The bus unit has a cycle decoder 50 which issues the clear signal to the flip-flop 40 of the targeted register 13 in the targeted processor unit 20–23.

Figure 5A:
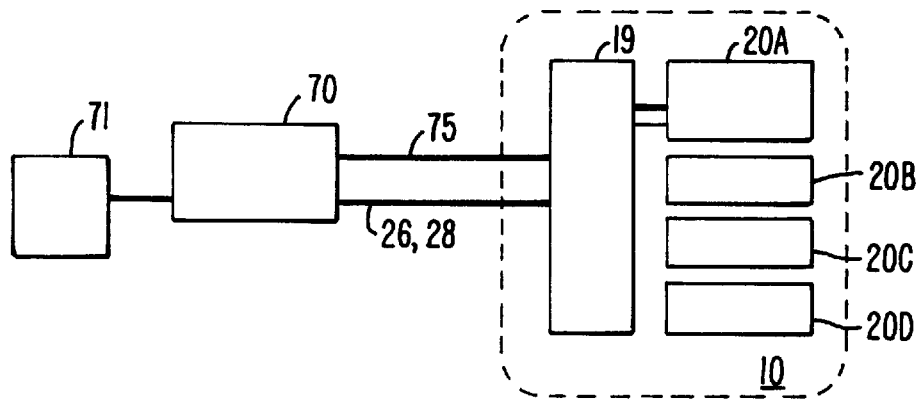
FIG. 5A is a block diagram of a system containing a processor unit on an integrated circuit, and a device coupled to the processor unit but external to the integrated circuit.

In accordance with the present invention the DERA operations may be used to permit interlocking of one or more of the processors 20 with one or more devices external to the integrated circuit 10. One such example is illustrated in FIG. 5A in which one of the processor units 20 is connected to hard disk drive. FIG. 5A illustrates the disk controller I/O logic 70 of the drive and the drive 71, both of which could be considered the expansion memory 49 in FIG. 1. The data is transferred on data paths 26 and 28. FIG. 5A also shows a control line 75 to the bus unit 19 to carry a DERAW Cycle signal, explained above, to the processor unit 20.

FIG. 5B lists the instruction code for the subroutine of the processor 20 to implement a high speed transfer of data from the disk 71 to a buffer in the memory 40. The subroutine counts the total number of transferred words and stops on an escape code in the data stream. The subroutine is initialized by setting up the buffer pointer in the R1 register and the transfer process begins. The process first performs a DERAR of the register to lock the register R2 and then checks for the escape code in the R2 register. If the data in the R2 register is not the escape code, the data is stored at the location pointed to by the R1 register. The pointer is incremented and the process begins over. At the transmitting end, the controller I/O logic 70 sends a 32-bit word and a DERAW Cycle signal at each transfer into the R2 register.

The exit of the subroutine occurs at the reading of the escape code in the register R2 and the count of the number of words transferred is stored.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. A computer system comprising:
   a plurality of processor units, each processor unit connected to other processor units for parallel processing and each processor unit associated with at least one register for receiving data for said processor unit;
   a bus unit connected to each processor unit, said bus unit transferring select data of a first processor unit into an associated register of a second processor unit in a single computer operation;
   circuit logic in said second processor unit preventing said second processor unit from accessing said associated register until said first processor transfers said select data, said circuit logic engaged by execution of a first instruction by said second processor unit wherein said circuit logic is operable to stall said second processor unit in response to said second processor unit attempting to access said associated register while said circuit logic is engaged; and
   wherein said bus unit operating in response to execution of a second instruction by said first processor unit disengages said circuit logic which enables said second processor unit to access said associated register, and the computer system further comprising an execution unit in said second processor unit operable to execute a third instruction that accesses said associated register, said third instruction designating a destination location and requiring input data which includes said select data for execution.

2. The computer system as in claim 1 wherein said third instruction is freely executable exclusively in response to said second processor unit being enabled to access said input data.

3. The computer system as in claim 1 wherein said third instruction is freely executable without determining status of use of said destination location.

4. The computer system as in claim 1 wherein said single computer operation occurs in one clock cycle.

5. The computer system as in claim 1 wherein each processor unit is associated with a plurality of registers, including said at least one register, for receiving data for said processor unit and said first instruction designates said register associated with said second processor unit.

* * * * *